United States Patent [19]

Pirker

[11] Patent Number: 5,288,020

[45] Date of Patent: Feb. 22, 1994

[54] SEAL ARRANGEMENT FOR ADJOINING WALLS OF A PROPULSION NOZZLE OF AN ENGINE

[75] Inventor: Klaus Pirker, Munich, Fed. Rep. of Germany

[73] Assignee: MTU Motoren-und Turbinen-Union München GmbH, Munich, Fed. Rep. of Germany

[21] Appl. No.: 38,504

[22] Filed: Mar. 29, 1993

[30] Foreign Application Priority Data

Apr. 1, 1992 [DE] Fed. Rep. of Germany ....... 4210804

[51] Int. Cl.$^5$ .................. F16J 15/46; F16L 27/00; B64C 15/02; F02K 1/12
[52] U.S. Cl. .................. 239/127.3; 239/265.11; 239/265.35; 239/265.37; 239/397.5; 277/27
[58] Field of Search ............ 239/127.1, 127.3, 265.11, 239/265.19, 265.33, 265.35, 265.37, 397.5; 277/27, 81 R, 83

[56] References Cited

U.S. PATENT DOCUMENTS

| | | | |
|---|---|---|---|
| 4,012,049 | 3/1977 | Lambrecht et al. | 277/83 X |
| 4,013,226 | 3/1977 | Willard | 239/265.37 X |
| 4,093,157 | 6/1978 | Cavanagh, Jr. et al. | 239/127.3 X |
| 4,098,076 | 7/1978 | Young et al. | 239/265.19 X |
| 4,110,972 | 9/1978 | Young et al. | 239/265.19 X |
| 4,575,006 | 3/1986 | Madden | 239/265.37 X |
| 4,575,099 | 3/1986 | Nash | 239/265.37 X |
| 4,576,548 | 3/1986 | Smed et al. | 277/27 X |
| 4,813,608 | 3/1989 | Holowach et al. | 239/265.19 X |
| 4,917,302 | 4/1990 | Steinetz et al. | 239/265.11 |
| 5,014,917 | 5/1991 | Sirocky et al. | 239/265.11 |
| 5,044,553 | 9/1991 | Degress | 239/265.19 X |
| 5,076,590 | 12/1991 | Steinetz et al. | 239/127.1 X |
| 5,078,412 | 1/1992 | Baumgarth | 239/127.1 X |
| 5,082,293 | 1/1992 | Steinetz et al. | 239/265.11 X |
| 5,115,979 | 5/1992 | Ellerhorst et al. | 239/265.37 |
| 5,143,292 | 9/1992 | Corsmeier et al. | 239/265.37 X |

FOREIGN PATENT DOCUMENTS 1283472  1/1987  U.S.S.R. ............... 277/27

*Primary Examiner*—Andres Kashnikow
*Assistant Examiner*—William Grany
*Attorney, Agent, or Firm*—Ladas & Parry

[57] ABSTRACT

Apparatus for sealing the side edges of flaps of a propulsion nozzle of an engine and the walls of a casing of the nozzle by sealing elements carried by the flaps and extending across a clearance between the side edges of the flaps and the walls. The sealing elements are carried in slots in the side edges of the flaps with clearance for capability of movement towards the walls. The sealing elements contact the walls to form a primary seal therewith. The flaps are formed with chambers carrying a pressure medium and plungers are supported in the flaps for being subjected to the pressure of the pressure medium and bearing against the sealing elements to urge the sealing elements against the surfaces of the walls. A differential pressure exists on both sides of the flaps and acts on the sealing elements in the clearance to press the sealing elements against respective side surfaces of the slots to form a secondary seal thereat.

17 Claims, 4 Drawing Sheets

SEAL ARRANGEMENT FOR ADJOINING WALLS OF A PROPULSION NOZZLE OF AN ENGINE

FIELD OF THE INVENTION

The invention relates to a seal arrangement for sealing adjoining walls of a propulsion nozzle of an engine, such as a hypersonic engine.

More particularly, the invention relates to a sealing arrangement for sealing a clearance between angularly offset walls, for both fixed and variable nozzles.

BACKGROUND

The geometry of propulsion nozzles for aerospace engines can be made variable by means of fixedly arranged wall elements on one side and variable primary and secondary flaps arranged opposite them on the other side. In this arrangement, a need exists for variable primary and secondary nozzle flaps and for fixedly arranged or adjustable wall elements alike to seal a clearance extending alongside the outer edges of the flaps and wall elements, respectively, relative to wall sections of a nozzle casing. A need often exists to seal a hot gas stream of the propulsion nozzle relative to the environment enclosed by the nozzle casing (pressure chambers) or relative to the atmosphere.

A clearance must also be provided between the fixedly arranged wall elements and adjoining nozzle casing walls to permit free expansion of the wall elements under differing service temperatures relative to the casing walls. The movable or variable flaps require means to bridge and seal the clearance, and allowance must be made for differential thermal expansion and for thermally induced wall distortions or warping.

In a conventional sealing means of the above type, primary sealing is achieved by means of a contact sealing effect produced exclusively by the differential pressure between the two chambers on opposite sides of the seal. Because of potential thermally induced distortions of a carrier of the seal in a slot and, thus, of the slot and the sealing element, the differential pressure required for the primary seal may not be safely developed at least in areas alongside the sealing clearance. In the worst case, the seal is made unserviceable by local jamming of the sealing element.

SUMMARY OF THE INVENTION

An object of the present invention is to provide a seal arrangement which provides safe and reliable sealing over the entire length of the clearance in the presence of substantial differential thermal effects between the wall elements and components of the seal.

In accordance with the invention, the sealing element is carried in a slot in one of the wall elements and is subjected to the pressure of an actuating means such that the sealing element is pressed against the surface of the other facing wall element.

In a particular embodiment of the invention, the actuating means comprises a pressure chamber in said one wall element carrying the sealing element and a plunger movably carried in said one wall element, said plunger being exposed to pressure in said pressure chamber and bearing against said sealing element to urge the sealing element against the surface of the other facing wall element to form a primary seal.

The sealing element projects from the slot into a clearance between the wall elements and is subjected on opposite side thereof to a pressure differential in the chambers on opposite sides of said one wall element to cause the sealing element to be urged by the pressure differential against a side surface of the slot to form a secondary seal thereat.

The invention provides an advantageous combination of the plunger, for example, in the form of a cylindrical pin or bolt and the sealing element, preferably of strip-type, which can optionally be divided into segments. For each sealing element, or each segment thereof, two plungers are provided which are subjected to the pressure in the pressure chamber. A control pressure is developed in the pressure chamber, for example, by air admitted under pressure which acts on the plungers to urge the respective sealing element against the surface of the facing wall element with the necessary contact pressure. In this arrangement, primary sealing is achieved by the control pressure producing the contact pressure for the primary seal independently of the varying differential pressure acting along the length of the clearance. Local thermally-induced distortion of the slot or sealing element, which heretofore caused malfunction when sealing was dependent entirely on differential pressure, has little, if any, adverse effect on the actuation of the plungers according to the present invention. The actuating members are carried between the pressure chamber and the slot with optimum sealing relative to the clearance to provide uniform contact pressure at all points with minimal losses of the control pressure. The actuating members can be sealed by piston rings or O-rings. Depending on the materials selected, the actuating members can generally be allowed relatively liberal play and can carry the local sealing means to permit sliding movement of the actuating members between the pressure chamber and the slot without risk of jamming. Extremely little play without risk of jamming can be achieved when the actuating members are made of a ceramic, temperature-resistant material with extremely low thermal expansion.

By means of the present invention, the sealing element forms independently of plunger movement, the secondary seal developed by the differential pressure between the two chambers on the opposite sides of the sealing element, the initial clearance of the sealing element can be designed, in a direction transverse to the longitudinal extent of the slot, such that there will be no risk of jamming, while the desired secondary effect of restricting the leakage flow is achieved. When the sealing element is made of a suitable ceramic material, there will be little risk of component distortion and jamming. Dividing the sealing element into segments serves to achieve optimum sealing in adaptation to distortions of the wall elements of the nozzle flap and/or the casing wall.

DETAILED DESCRIPTION OF PREFERRED EMBODIMENTS

Figure 1:
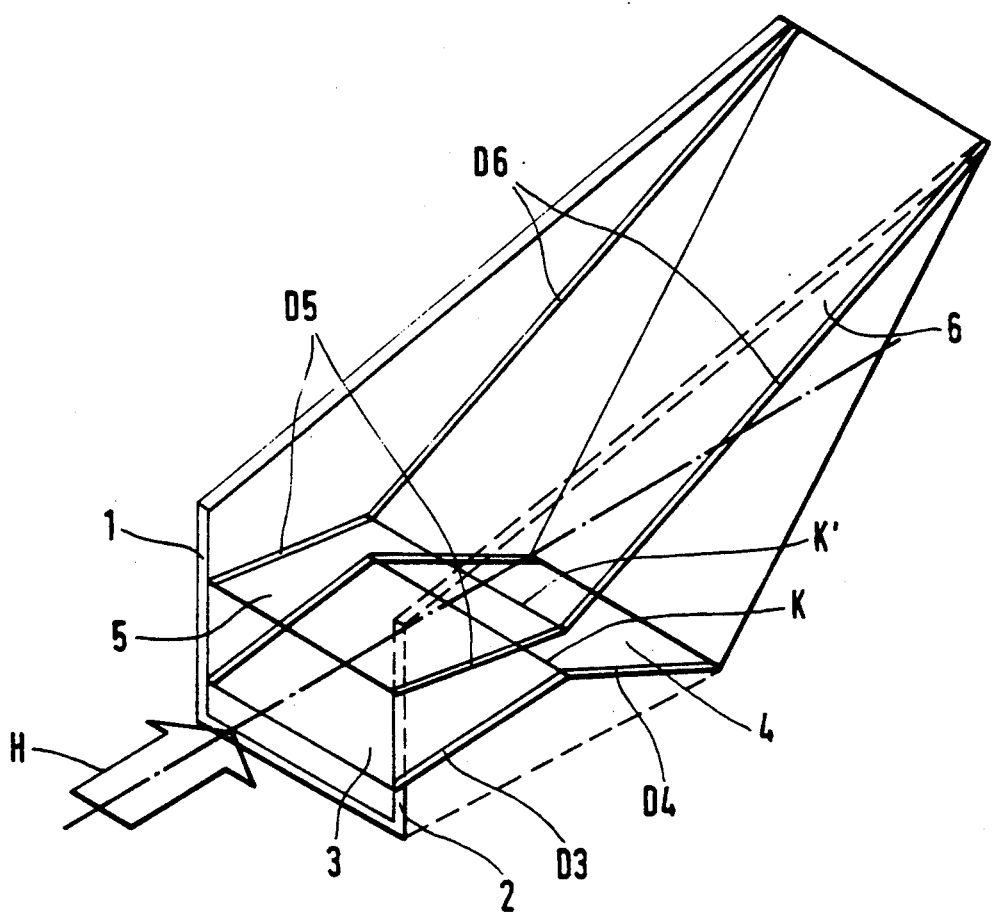
FIG. 1 is a schematic, perspective view of a variable convergent/divergent propulsion nozzle for a hypersonic engine.

With reference now to FIG. 1, a typical application for implementing the present invention is shown for a variable convergent/divergent propulsion nozzle N of a hypersonic engine. The propulsion nozzle N is internally traversed by hot gases flowing axially in the direction of arrow H. The nozzle N includes opposed, spaced, lateral walls 1, 2 of a casing of the nozzle. Fixedly arranged between the lateral walls 1, 2 are lower wall elements 3, 4 forming a fixed angle therebetween with a line of intersection K extending transversely between the walls 1, 2. Upper wall elements 5, 6 face the lower wall elements 3, 4 and form a transverse line of intersection K' therebetween. The upper wall elements 5, 6 respectively constitute variable primary and secondary flaps to adjust convergence and divergence of the nozzle as well as the size of the throat of the nozzle formed between intersection lines K and K'. Sealing means between the lateral edges of the wall elements 3, 4, 5, 6 and walls 1, 2 are provided along sealing lines D3, D4 (bottom) and D5, D6 (top) in a manner to be described in greater detail hereafter.

Figure 2:
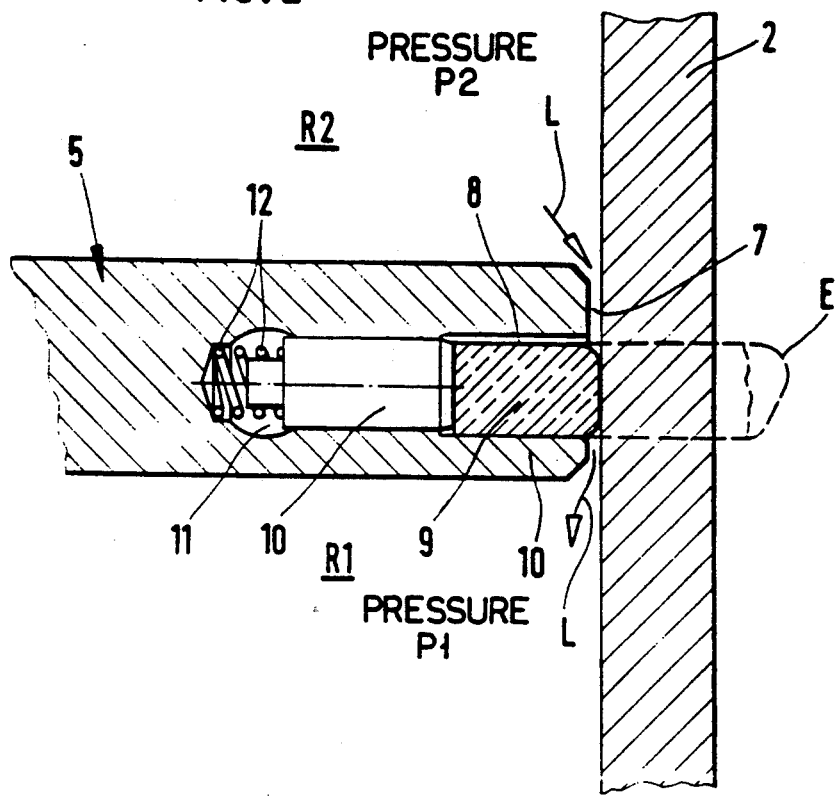
FIG. 2 is a transverse sectional view, on enlarged scale, illustrating means for sealing the clearance between a flap-like variable wall element of the nozzle and an adjoining wall element of a nozzle casing.

FIG. 2 illustrates the sealing means for sealing a clearance 7 along the sealing line D5 (FIG. 1) between the upper variable wall element 5 (primary flap) and wall 2 of the nozzle casing. The wall element 5 and wall 2 adjoin one another approximately at right angles and define separate compartments R1, R2 which are sealed from one another. The compartment R1 forms a portion of the main duct of the propulsion nozzle, and compartment R2 is in part enclosed between the wall element 5 and a portion of the nozzle casing and is supplied with air under pressure as a sealing or cooling medium. The compartment R2 may be subdivided into longitudinally successive chambers. In the present case, the pressure in the compartment R2 is designated by P2, and in the compartment R1 by P1 (hot gas). In this arrangement, the variable wall element 5 forms clearance 7 with wall 2 and is provided with a slot 8 which opens into the clearance 7. A sealing element 9 is movably supported in the slot 8. The sealing element 9 extends longitudinally along the clearance 7 and is movable transversely to take up the clearance. A plurality of equally spaced actuating members in the form of plungers 10 are successively arranged and slidably supported in the wall element 5 to project at one of the ends thereof into slot 8 and at the other of the ends into a pressure chamber 11. The plungers 10 can be sealed in the wall element by sealing rings or O-rings (not shown). In chamber 11, a control pressure is produced by air fed under pressure, such as compressor air of a flight engine, which acts on the ends of plungers 10 to urge the plungers 10 and, thus, the sealing element 9 across the clearance 7 into a give contact pressure against the wall 2 of the nozzle casing. The contact end of the sealing element 9 is rounded and forms a contact seal (primary seal) relative to the companion face of the wall 2. Additional sealing and possible cooling air flows into the clearance 7 against the sealing element 9 forming the primary seal as a leakage flow L due to the pressure difference prevailing between the two compartments R1 and R2 especially at the clearance 7. On account of this differential pressure, the sealing element 9 is pressed against the lower surface of slot 8 to produce a sealing effect (secondary seal). A secondary leakage flow passageway is allowed to remain in the slot 8 at the upper surface. At their ends facing away from the sealing element 9, the plungers 10 are in contact with springs 12 in the pressure chamber 11 so that in its position of rest, the rounded contact face of sealing element 9 is relatively gently urged into tangential contact against the wall 2. This prevents the sealing element 9 from undergoing a jerky start-up movement against the wall 2 when actuated and thus from being subjected to premature wear.

The sealing element 9 can have an unsymmetrically curved end face E, as shown in dotted line in FIG. 2, to form a contact seal adapted to varying differential pressures. In this manner, the seal contact face, and thus the frictional resistance, can be reduced especially when sealing must be effected in the presence of relative mutual movement.

Figure 3:
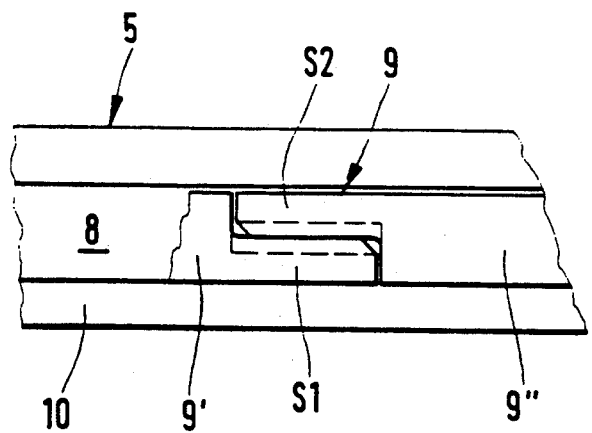
FIG. 3 is a sectional front view, partly broken away, of a portion of the flap-like wall element of FIG. 2 in the form of a segmented sealing element with overlapping ends.

As seen in FIG. 3, the sealing element 9, which is in the form of a strip, is divided into individual segments 9', 9" installed in the slot 8. The segments 9', 9" have capability of limited relative movement and are provided with overlapping sections S1, S2 between adjacent segments. In a preferred arrangement, each single-piece sealing element 9 or each segment 9' or 9" bears against two plungers 10. Segmentation of the sealing element 9 serves to maintain good sealing action by taking up surface distortions caused in manufacture or service, such as warping or furrowing of the wall 2 when the variable primary and secondary flags undergo adjustment movement.

Figure 4:
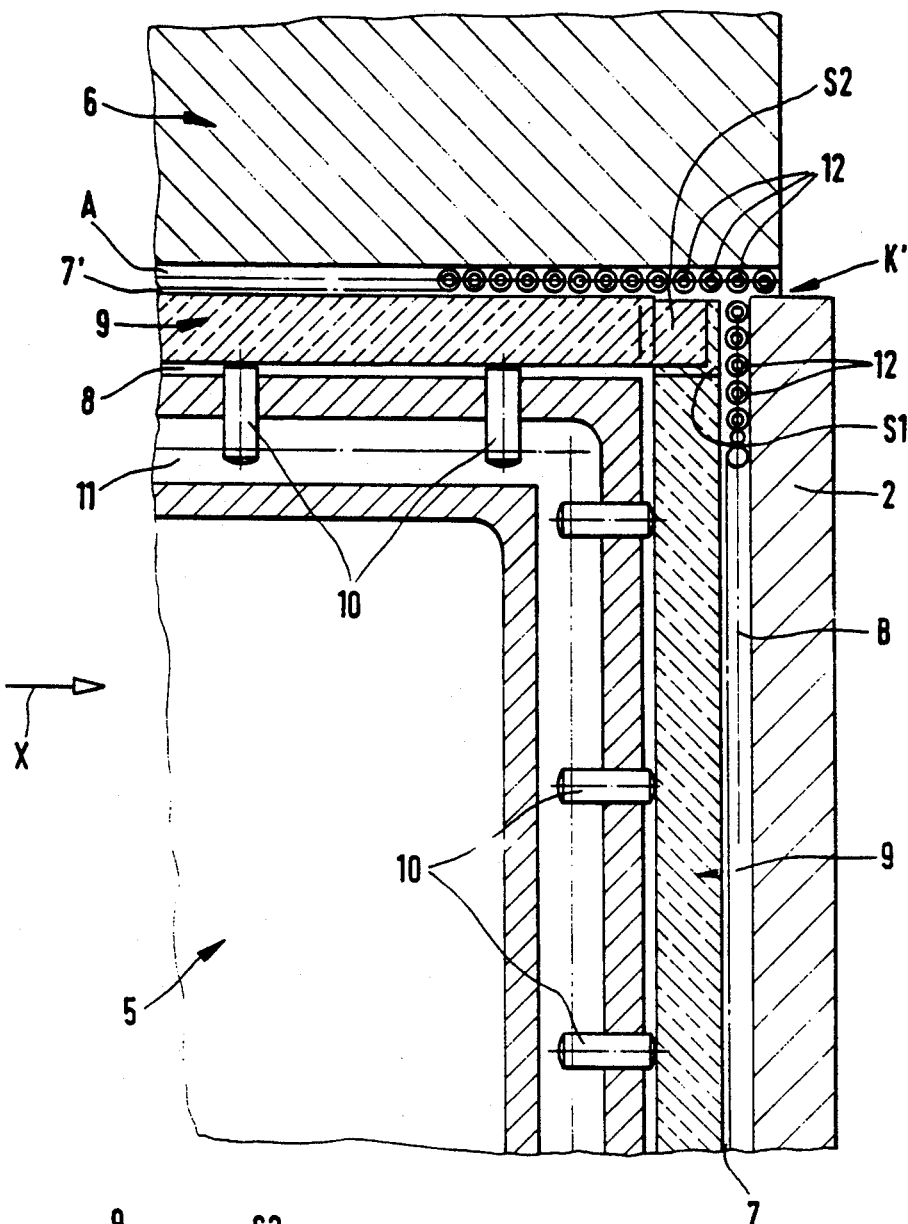
FIG. 4 is a sectional, plan view in a corner region of the nozzle taken through wall elements serving as primary and secondary flaps, with means for transverse sealing a rectangular clearance formed in part along a transverse hinge axis between the primary and the secondary flaps and in part in a longitudinal direction between the primary flap and a wall element of the casing.

Using the same reference numerals for essentially identical or similar components, FIG. 4 shows a rectangular disposition of clearances 7', 7 between upper wall elements 5, 6 coupled together along the variable line of intersection K' (FIG. 1) for relative movement as primary and secondary flaps and between the sides of wall elements 5, 6 and wall 2 of the nozzle casing. More specifically, clearance 7' is between the transverse edges of the upper wall elements 5, 6 at the line of intersection K' and the clearance 7 is between the lateral edges of the wall element 5, and the adjoining walls 1, 2 of the nozzle casing. FIG. 4 shows the arrangement of the clearance 7 between the wall element 5 and wall 2 and the arrangement at wall 1 is the same. In this arrangement, the corner area formed by the clearances 7', 7 is sealed by a rectangularly overlapping arrangement of the end sections S1, S2 (cf. enlarged view in FIG. 5) of the sealing elements 9, which form a right angle therebetween. In adaptation to the geometry of the clearances 7', 7, this results in a correspondingly rectangular form of the locally continuous slot 8 and the pressure chamber 11. As seen in FIG. 4 surfaces A, B of the wall element 6 and the wall 2 of the nozzle casing which bound the sealing clearances 7', 7 are formed as a succession of adjacent tubes 12 which, in operation are fed with a coolant to cool the adjoining components. The plungers 10 are shown in equally spaced successive arrangement in FIG. 4 for sealing clearances 7 and 7', the plungers 10 being formed as smooth, cylindrical pins or bolts.

Figures 5, 6:
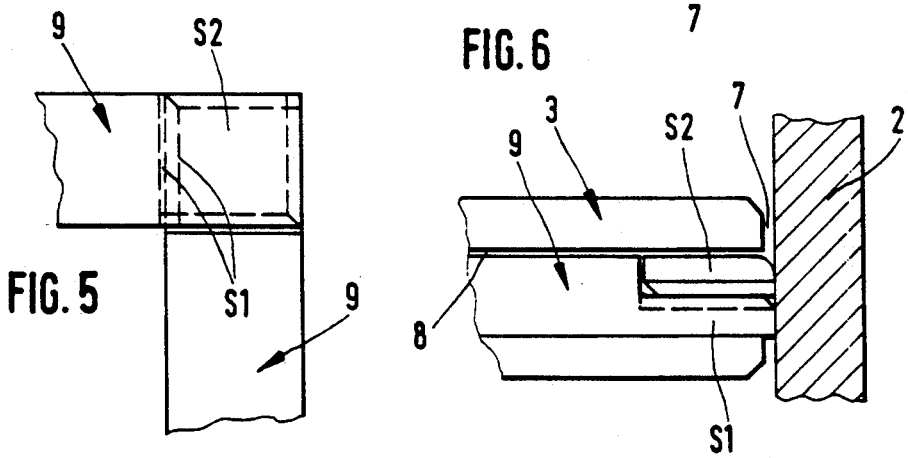
FIG. 5 is an enlarged view of a portion of FIG. 3 illustrating an overlapping area of segmented sealing elements at the corner of the rectangular clearance between adjacent components.
FIG. 6 is an elevational view at the corner area of a rectangular sealing clearance between a stationary flap element and a stationary wall element of the nozzle casing.

Illustrated in FIG. 6, by way of example, is an alternative sealing means between stationary lower wall element 3 (the primary flap fixedly secured at a fixed angle relative to wall element 4) and fixed wall 2 of the nozzle casing. A further clearance which can be sealed by the sealing means shown in FIG. 6 extends transversely along the front of the wall element 3, shown open in FIG. 1, and which terminates at the clearance 7 at right angles. In this configuration, the clearance arrangement at the front end, which is not shown in the drawing, can be formed by an inlet piece on the nozzle to supply the hot gas stream continuously into the nozzle. The overlapping sections S1, S2 in FIG. 6 are arranged similarly to FIGS. 4 and 5 at an angle to one another and above one another.

In order to supply the primary seal with cooling and sealing air, the overlapping arrangement of the components of the sealing element 9 in accordance with FIG. 3 to 6 can be used directly or by locally sizing the clearances accordingly at the sealing element 9 or segments 9', 9''. This assumes that the pressure difference is utilized between the compartments R2, R1, meaning that P2 (compressed or sealing and cooling air) is greater than P1 (hot gas).

Figure 7:
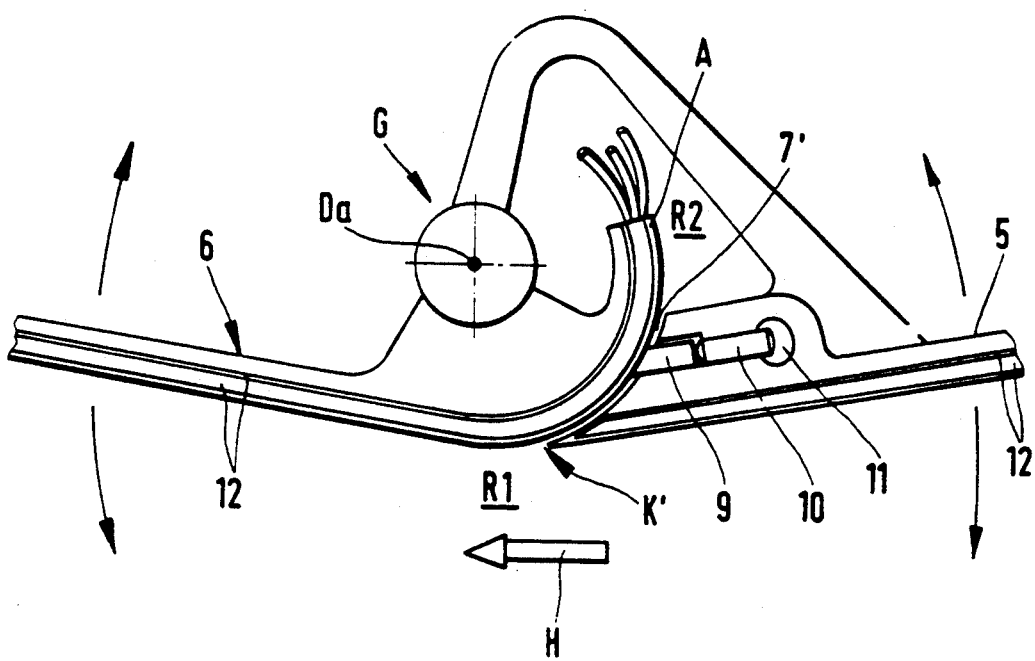
FIG. 7 is a diagrammatic, sectional view of a propulsion nozzle having wall elements of primary and secondary flaps hingedly coupled to each other and provided with a sealing means to compensate for relative movement, as viewed in the direction of arrow X in FIG. 4.

FIG. 7 illustrates the primary and secondary flaps 5, 6 which are pivotally coupled to each other, to vary the angle between the flaps 5, 6 at the line of intersection K'. The pivotal connection of the flaps 5, 6 is obtained by means of a pivotal joint G to produce a variable nozzle geometry in accordance with FIGS. 1 and 4, in relation to the direction H of the hot gas stream through the nozzle. The pivotal joint G provides a rotary axis Da extending at right angles to the nozzle centerline. The clearance 7' extends substantially concentrically around the axis Da and is sealed between compartments R1 and R2 in a manner similar to that described for FIG. 2. The sealing element 9 in FIG. 7 has an obliquely rounded end to mate with the rounded companion face of section A formed by tubes 12 of flap 6.

In a further advantageous aspect of the present invention, the sealing elements 9 and/or the plungers 10 are made of a ceramic material, such as silicon carbide or silicon nitride. Such a material resists high temperature and has a comparatively low coefficient of thermal expansion.

In a further advantageous embodiment, the sealing element 9 can be formed as an ablation cooled elastic material extending over the entire depth of the slot in a metal mounting slidably carried in the slot.

The present invention also has utility in variable-geometry two-dimensional engine intake ducts, especially when applied to compound turboramjet engines, where especially in the ramjet mode, extremely differing temperature stresses and expansions need to be accommodated between cooperating wall components while ensuring mutually relative sealing effect.

The invention will also have utility in so-called vertoplane turbine engines of variable performance characteristics, where variable mass flow distributions in various engine operations are provided by combining variable or slidable and stationary wall elements.

Although the invention has been described in relation to specific embodiments thereof, it will become apparent to those skilled in the art that numerous modifications and variations can be made within the scope and spirit of the invention as defined in the attached claims.

What is claimed is:

1. Apparatus for sealing first and second wall elements, one of said wall elements having an end face facing a surface of the other of said wall elements with a clearance therebetween, said one wall element having a slot therein which opens at said end face into said clearance, a sealing element movably supported in said slot and projecting therefrom to contact the surface of said other wall element and form a primary seal therewith, said one wall element forming chambers on opposite sides thereof which are sealed from one another by said primary seal and which are subjected to differential pressures, actuating means for pressing said sealing element against the surface of said other wall element, said actuating means comprising a pressure chamber in said one wall element, a plunger movably carried in said one wall element, said plunger being subjected to pressure in said pressure chamber, causing said plunger to bear against said sealing element to urge the sealing element against the surface of said other wall element, said sealing element projecting from said slot into said clearance and being subjected on opposite sides thereof to the pressure differential in said chambers to cause said sealing element to be urged by said pressure differential against a side surface of the slot to form a secondary seal thereat.

2. Apparatus as claimed in claim 1, wherein said sealing element has a rounded surface facing said other wall element to make tangential contact therewith.

3. Apparatus as claimed in claim 1, comprising spring means in said pressure chamber for acting on said plunger to lightly press the sealing element against said other wall element.

4. Apparatus as claimed in claim 1, wherein said sealing element comprises a plurality of sealing segments independently movable in said slot and having overlapped ends.

5. Apparatus as claimed in claim 4, wherein said segments are formed with predetermined leakage clearance between said overlapped ends.

6. Apparatus as claimed in claim 4, wherein said clearance forms sections at right angles to one another at a corner formed by said wall elements, said sections of the clearance being sealed by said overlapped ends of said sealing segments which overlap at right angles at said corner.

7. Apparatus as claimed in claim 4, comprising two of said plungers acting on each sealing segment, said plungers being spaced apart in a longitudinal direction of the clearance.

8. Apparatus as claimed in claim 1, comprising two of said plungers acting on said sealing element, said plungers being spaced apart in a longitudinal direction of the clearance.

9. Apparatus as claimed in claim 1, wherein said plunger comprises a cylindrical member.

10. Apparatus as claimed in claim 1, wherein at least one of said plunger and said sealing element is made of high temperature resistant ceramic material.

11. Apparatus as claimed in claim 10, wherein said ceramic material is selected from the group consisting of silicon carbide and silicon nitride.

12. Apparatus as claimed in claim 1, wherein said first wall element comprises a flap of a propulsion nozzle of an engine.

13. Apparatus as claimed in claim 12, wherein said second wall element comprises a wall of a casing of said propulsion nozzle.

14. Apparatus as claimed in claim 13, wherein said propulsion nozzle comprises a further flap pivotably movable relative to the first said flap.

15. Apparatus as claimed in claim 14, comprising a respective said sealing element between each flap and said wall of the casing of said nozzle.

16. Apparatus as claimed in claim 13, wherein said propulsion nozzle comprises a further flap, said apparatus further comprising a further sealing element between both said flaps.

17. Apparatus as claimed in claim 16, wherein the first said sealing element and said further sealing element have overlapping ends capable of relative movement.

* * * * *